United States Patent
West, III et al.

(10) Patent No.: US 11,845,232 B2
(45) Date of Patent: Dec. 19, 2023

(54) ARMOR PREPARATION METHOD AND SYSTEM

(71) Applicant: CWT Armor Solutions, LLC, Vinton, VA (US)

(72) Inventors: Norvell W. West, III, Hardy, VA (US); Erin N. McKee, Hardy, VA (US)

( * ) Notice: Subject to any disclaimer, the term of this patent is extended or adjusted under 35 U.S.C. 154(b) by 0 days.

(21) Appl. No.: 17/666,157

(22) Filed: Feb. 7, 2022

(65) Prior Publication Data

US 2023/0249419 A1    Aug. 10, 2023

(51) Int. Cl.
| | |
|---|---|
| B29C 70/50 | (2006.01) |
| B29C 70/54 | (2006.01) |
| F41H 5/04 | (2006.01) |
| B29K 277/00 | (2006.01) |
| B29K 105/08 | (2006.01) |
| B29L 31/00 | (2006.01) |

(52) U.S. Cl.
CPC .......... B29C 70/504 (2013.01); B29C 70/545 (2013.01); *B29K 2105/08* (2013.01); *B29K 2277/10* (2013.01); *B29L 2031/768* (2013.01); *F41H 5/0478* (2013.01)

(58) Field of Classification Search
CPC ... B29C 70/504; B29C 70/545; B29C 33/026; B29C 33/044; B29C 33/065; B29C 33/085; B29C 43/08; B29C 2043/3422; B29C 43/3697; B29C 43/46; B29C 2043/467; B29C 2043/468; B29C 44/30
See application file for complete search history.

(56) References Cited

U.S. PATENT DOCUMENTS

2021/0213690 A1* 7/2021 Koshi ................. C08J 5/24

* cited by examiner

*Primary Examiner* — Stella K Yi
(74) *Attorney, Agent, or Firm* — Rhodes IP PLC; Christopher R Rhodes

(57) ABSTRACT

The present invention provides a system and method for preparing armor made of para-aramid fibers, including a plurality of rollers feeding an input source of the para-aramid fibers, the fibers being at a first temperature. The system and method include a heating mechanism encapsulating at least a portion of the plurality of rollers, the heating mechanism heating the para-aramid fibers fed by the rollers from the first temperature to a second temperature. The method and system include a press, including a plurality of plates, whereupon the para-aramid fibers reaching the second temperature, the para-aramid fibers are fed into and compressed between the plurality of plates by the press, and heated to a third temperature. The method and system include a cooling section supporting the plurality of plates and the para-aramid fibers compressed therein while the para-aramid fibers cool from the third temperature to a fourth temperature.

18 Claims, 3 Drawing Sheets

ARMOR PREPARATION METHOD AND SYSTEM

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent files or records, but otherwise reserves all copyright rights whatsoever.

RELATED APPLICATIONS

There are no related applications.

FIELD OF THE INVENTION

The present invention relates generally to making armor using polyethylene para-aramid source material and more specifically to manufacturing methods and systems for relatively high speed and high quality armor production in a continuous or mostly continuous process.

BACKGROUND

Para-aramid fibers are used to create armor elements, including military uses, first-responder uses, and personal protection uses.

There are several known manufacturing techniques to hydro-form polyethylene para-aramids. These techniques have mixed results. These current solutions are a single insertion process, contributing to a slow manufacturing process. These current hydro-forming solutions include lamination limitations. A common shortfall of the current techniques include delamination problems with layers failing to bond into a single homogenous plate.

Under current techniques, making sufficiently strong and lightweight body armor can only be produced at a rate of 6-10 pieces per hour with potential manufacturing defects including de-lamination. Thus, there exists a need for a method and system manufacturing armor products having the requisite strength in a continuous operation.

BRIEF DESCRIPTION

The present invention provides a system and method for preparing armor made of fibers, such as para-aramid fibers or related fibers. The method and system is a continuous feed system.

The system and method include a plurality of feed rollers feeding an input source of the para-aramid fibers, the fibers being at a first temperature, such as room temperature. The system and method include a heating mechanism encapsulating at least a portion of the feed rollers, the heating mechanism heating the para-aramid fibers fed by the feed rollers from the first temperature to a second temperature. In one embodiment, the second temperature can be around 180-190 degrees Fahrenheit.

The method and system include a press with a plurality of press rollers. When the para-aramid fibers reach the second temperature, the para-aramid fibers are fed into the press rollers and compressed therein. When passing through the press, the para-aramid fibers are heated to a third temperature. In one embodiment, the third temperature can be around 205-215 degrees Fahrenheit.

The method and system include a cooling tunnel for receiving the para-aramid fibers in a pressed state. The para-aramid fibers pass from the press rollers into the cooling tunnel by, in aspects, being pressed against a plurality of plates acting as a weighted mold against the fibers while at or near the third temperature.

The para-aramid fibers pass along the cooling tunnel, cooling from the third temperature to a fourth temperature, held in the pressed state. In one embodiment, the fourth temperature can be near room temperature or in a range from 130 degrees Fahrenheit to at or below room temperature.

Upon removal from the cooling tunnel, the system and method include shaping the para-aramid fibers into an armor element.

In one embodiment, the para-aramid fibers are fed by the feed rollers from a plurality of spools in the spool assembly. In one embodiment, the plates associated with the press receiving the fibers from the press roller may include a curved shape.

The system and method can operate in an assembly process for creating multiple armor elements in a continuous process. One embodiment can include a cutting element, such as a water jet, disposed at an end segment of the cooling tunnel for separating the flow of para-aramid fibers into sized segments for shaping into armor elements.

The present method and system provide continuous or near continuous forming of fabric polyethylene para-aramids. Continuous forming is made available through the use of a heat source, a press, and a cooling tunnel. The method and system can produce a greater capacity of armor elements or plates over a period of time, such as per hour, on a single machine or device.

The formation process further improves the para-aramid material properties, including in aspects a V-50 of 3,950 feet per second. Additionally, the method and system can: require less labor; decrease production times; produce less waste over existing techniques; and/or provide for stronger, lighter, and/or more optimized armor properties (e.g., the resultant armor can have a higher V-50 rating).

A better understanding of the disclosed technology will be obtained from the following detailed description of the preferred embodiments taken in conjunction with the drawings and the attached claims.

DETAILED DESCRIPTION

As described herein, the present method and system improves preparation of armor and formation of armor elements composed of or comprising para-aramid fibers.

Figure 1:
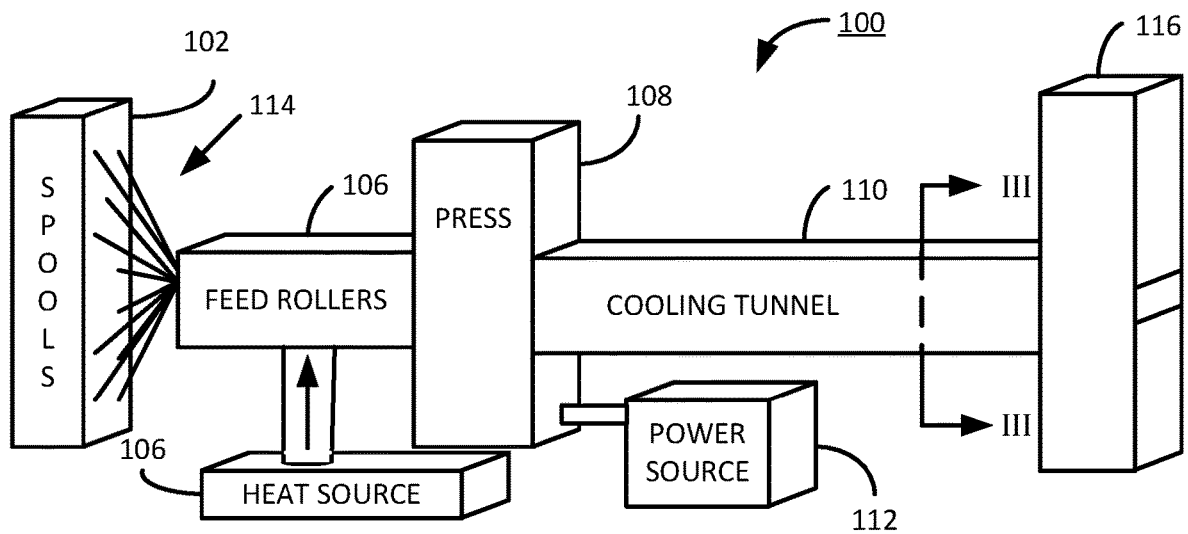
FIG. 1 illustrates a system diagram of one embodiment of a system for preparing armor.

FIG. 1 illustrates one embodiment of a system 100 for preparing armor made of polyethylene para-aramid fibers. The system 100 includes a spool assembly 102, a feed roller section 104, a heat source 106, a press 108, a cooling tunnel 110, and a power source 112. The system 100 additionally includes, in one embodiment, a cutting element 116.

The spool assembly 102 includes any number of spools having polyethylene para-aramid fibers 114 spooled thereon. The spools and the para-aramid fibers can be para-aramid fibers as commercially available from DuPont de Nemours, Inc. of Wilmington, DE.

The feed rollers 104 include a corresponding number of rollers receiving the para-aramid fibers 114 from the spool assembly 102. The feed rollers 104 combine the various feeds 114 into the combination of para-aramid fibers as processed according to the techniques herein. In one embodiment, a roller 104 may be a feed roller available from ARC International, Charlotte North Carolina.

The heat source 106 can be any suitable source providing heat to the feed roller 104. As described herein, the para-aramid fibers can be heated as they pass along the feed rollers 104. In one embodiment, the heat source 106 can be a propane-based heater burning propane fuel and generating heat that is fed into the feed rollers 104. Further embodiments may be provided, including pulling heat from external sources, passing heated water pipes, or other techniques as noted herein, or as would be understood by one of ordinary skill in the art.

The feed rollers 104 can connect to the press 108, described in greater detail in FIG. 2 below. The press 108 can also receive heat from the heat source for additional heating of the para-aramid fibers. The fibers pass through the feed rollers 104 having reached a specific or preferable temperature range, the press 108 then applies a pressing force compressing the numerous fiber layers into a composite material. In one embodiment, the system may include separate heat zones, heating the para-aramid fibers to specific or preferable temperature points within or while passing through the zones. For example, a first heat zone can be fed by fluid at about 140-190 degrees Fahrenheit. A second heat zone can be fed by fluid at about 190-210 degrees Fahrenheit, and a third heat zone can feed heat to the rollers maintaining heat at about 215-225 degrees Fahrenheit. As noted below, the para-aramid fibers can have different processing characteristics at different temperatures, so the heat zones can correspond with the same or different processing operations, characteristics, preferences, or applications.

The press, in one embodiment, uses press rollers that not only press the fibers but also pull the fibers through the feed rollers 104 and push the fibers through forming plates acting as weighted molds and down the cooling tunnel.

In one embodiment, the power source 112 powers the press 108 to apply the requisite pressing force against the para-aramid fibers and maintain movement of the fibers along the system 100. The power source 112 rotates the press rollers.

The cooling tunnel 110 is connected to and receives the pressed para-aramid fibers from the press 108. In a preferred embodiment, the cooling tunnel 110 has a defined internal cavity that maintains the compression of the para-aramid fibers as compressed by the press 108.

In aspects, the rollers shape the aramids and the shaped aramids are then fed into plates. The plates hold the shape of the para-aramid fibers as they cool. In one embodiment, the plates run the length of the cooling tunnel.

In a preferred embodiment, the cooling tunnel 110 has a defined length allowing the para-aramid fibers to cool from a temperature existing at, in, or near the press 108 to a stable temperature (such as a final temperature) where the para-aramid fibers maintain, for example, adequate or sufficient structure, rigidity, and armor properties, as well as being in a state for forming into armor elements. In one embodiment, the cooling tunnel has a length of 40 feet. It is recognized other lengths are usable herein and the 40 feet length is not a limiting or express limitation.

The system exemplified in FIG. 1 can operate by the feed rollers 104 receiving numerous para-aramid fiber feeds from the spool assembly 102. The incoming fiber feeds 114 are at a first temperature, such as a room temperature.

In aspects, the present method and system use a predetermined number of layers of para-aramid fibers to form Level IIIA, III, III+, or IV from a polyethylene para-aramid cut to a specific width.

The merging of the feeds 114 by the feed rollers 104 form the para-aramid fibers. The application of heat from the heat source 106 heats the para-aramid fibers being fed by the feed rollers from the first temperature to a second temperature. In one embodiment, the second temperature can be within a range of 170-200 degrees Fahrenheit, with one embodiment having a preferred temperature of 190 degrees Fahrenheit. This heating of the fibers forms a pre-bonding prior to the press 110. Additionally, in aspects, at around 190 degrees Fahrenheit, the para-aramid fibers become pliable for being fed into the press.

Heating to the second temperature can be achieved by adjusting both the amount of heat from the heat source as well as the speed of the feed rollers. Additionally, management of speed of heating can be controlled for embedding a proper amount of entropic energy within the para-aramid fibers for managing subsequent cooling times. Also, heating is modulated to avoid heating the para-aramid fibers too fast and creating adverse and unwanted side-effects.

Upon reaching the second temperature, the para-aramid fibers can be fed into the press 108. FIG. 2 illustrates one embodiment of the press 108 including press rollers 120 and 122. The press 108 and rollers assert a pressing force against the para-aramid fibers 130 received from the feed rollers 104. In one embodiment, pressing force can be in a range between 40-60 tons of pressure, with a preferred pressure around or at 50 tons of pressure.

In addition to asserting a pressing force, the system 100 can increase the temperature of the para-aramid fibers to a third temperature. In one embodiment, this third temperature can be within a range of 200 to 215 degrees Fahrenheit, with a preferred temperature of around or at 205 degrees Fahrenheit.

In one embodiment, the para-aramid fibers rise in temperature from room temperature to 170+ degrees Fahrenheit, then to upwards of 210+ degrees Fahrenheit when encountering the press. The aramids can enter the cooling tunnel at temperatures around 220 degrees Fahrenheit and then begin to cool.

The press 108 additionally includes a plurality of plates for forming the para-aramid fibers as they pass therethrough. The plates can have offsetting shapes and form a weighted mold against the passing para-aramid fibers.

Figure 2:
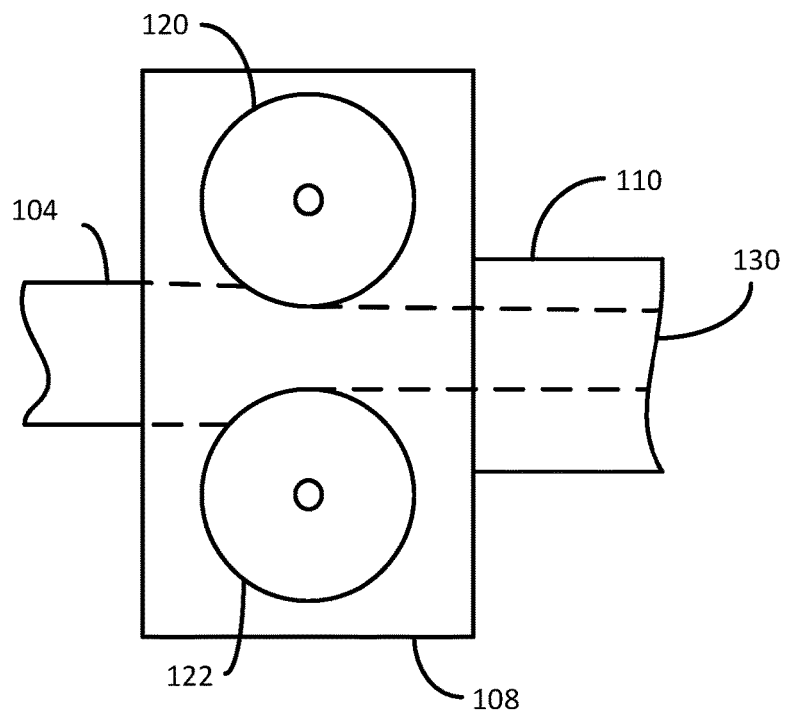
FIG. 2 illustrates one embodiment of a press in the system for preparing armor.

Visible in FIG. 2, the para-aramid fibers 130 are fed into the cooling tunnel. With reference back to FIG. 1, the cooling tunnel 130 has a defined length allowing for the para-aramid fibers to cool while passing along the tunnel 130.

The length relates to the flow rate of the para-aramid fibers, as controlled by the press 108, as well as material properties for cooling the fibers in a controlled manner to retain benefits of the subsequent armor elements. For example, in one embodiment the cooling tunnel 110 may have a length of approximately 40 feet, allowing the para-aramid fibers to cool down to a fourth temperature in a controlled manner. In one embodiment, the fourth temperature may be similar or identical to the first temperature, at or around room temperature.

Figure 3:
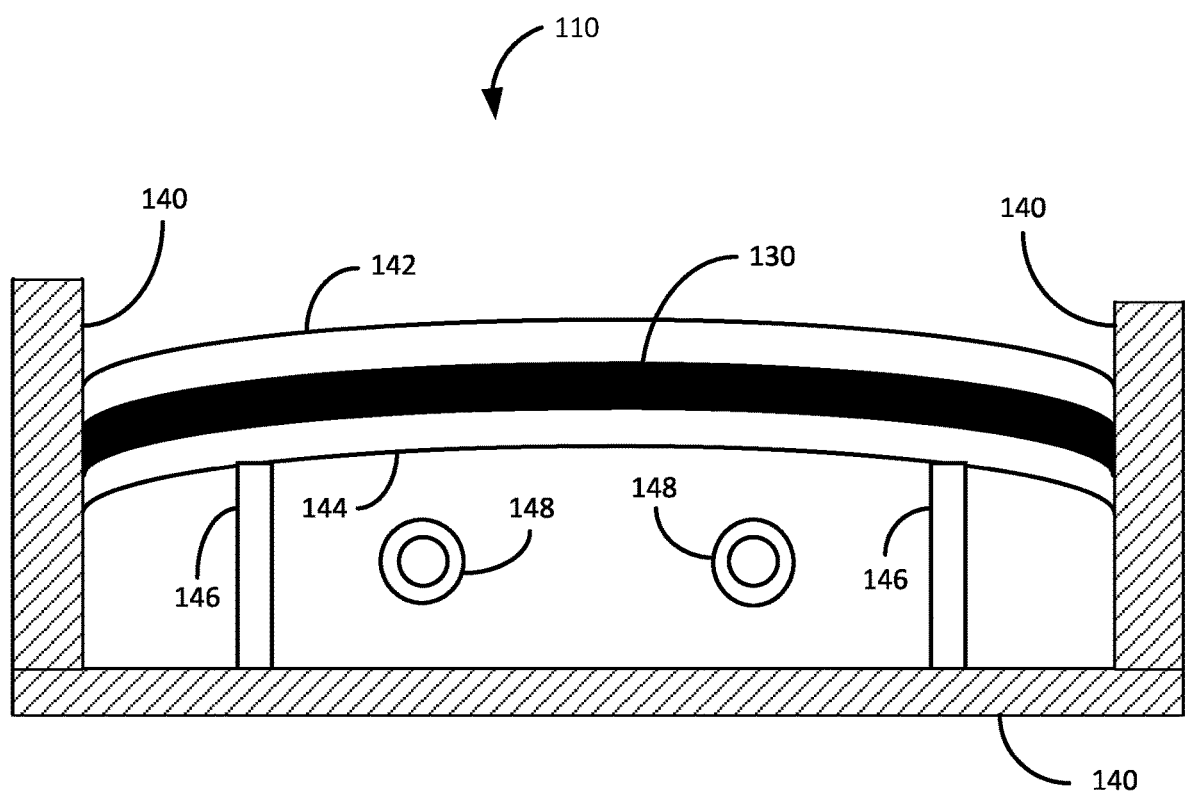
FIG. 3 illustrates one embodiment of a cross-section of a cooling tunnel in the system for preparing armor.

FIG. 3 illustrates a cross-section of this embodiment of a cooling tunnel 110. The shape of the tunnel maintains the para-aramid fibers in the compressed state while cooling. The FIG. 3 cross-section shows the tunnel 110 with an outer layer 140. For example, this outer layer can be a protective heat-dissipating material wrapped around the tunnel 110, and can include insulation in one embodiment. The layer 140 may include a metal frame or other shielding material. In one embodiment, the fibers 130 pass within the defined channel 144 separated from the layer 142 with a water chamber 146.

Further visible in the cross-section of FIG. 3, there are two plates, plate 142 and plate 144. These plates 142, 144 can be made of metal or any other suitable material generating the weighted mold against the para-aramid fibers compressed therebetween. The plate 144 is held in place using support members 146 and heat coil piping 148 can be included to help pull off heat from the para-aramid fibers 130.

In another embodiment, an airflow duct can be used instead of or in combination with the water channel to pull heat from the para-aramid fibers. Additional embodiments may be utilized for extracting or pulling heat from the para-aramid fibers as they pass along the cooling tunnel. The various techniques for extracting heat operate with the continuous flow of the compressed and molded para-aramid fibers being maintained in the compressed state as the fibers cool from the pressing temperature in excess of 200 degrees Fahrenheit back to a stable or usable temperature around room temperature, or in a range from 130 degrees to at or below room temperature.

The para-aramid fiber flow the length of the cooling tunnel 110, held in the compressed state between the plates 142, 144. The flowing of the para-aramid fibers 130 is controlled by being pushed by the roller 108 of FIG. 2.

Sizing of the tunnel can be maintained or adjusted based on armor element sizing. In one embodiment, the tunnel can have a 12 inch width and a 3A inch thickness based in part on the rollers. The rollers can be adjusted to any suitable sizing, including for example between 12 and 36 inches wide.

In one embodiment, the cooling tunnel 110 is approximately 40 feet long. The length of the tunnel 110 is in part based on the flow rate of the para-aramid fibers, the required time to cool the fibers to the fourth temperature, and a production rate for manufacturing armors.

Upon proper cooling, the para-aramid fibers will maintain the shape defined by the tunnel. The subsequent material properties and rating of the armor element can be defined by the number of layers of para-aramid fibers fed into the feed rollers 104 prior to heating and pressing.

In one embodiment, the system 100 can include the cutting device 116 for forming armor elements upon passage through the cool tunnel 110. FIG. 1 illustrates one embodiment with the device 116 disposed at the end of the tunnel 110, where the para-aramid fibers have returned to the fourth temperature and can be properly handled without affecting or distorting its material properties. In another embodiment, the cutting element 116 may be separate from or external to the system 100, including for example being in specialized facility for precision cutting of armor elements. Where the cutting element 116 is separate from the cooling tunnel 110, slabs of cooled molded para-aramid fibers can be transported to the cutting element. Whereas, the FIG. 1 embodiment allows for cutting of slab(s) as they exit the cooling tunnel 110, for example cutting slabs in 1 foot, 2, foot, 3 foot, 4 foot, and so on, or any other length sections.

One embodiment includes the cutting element 116 being a water jet. The water jet is operative to shape the para-aramid fibers into an armor element by cleaving the armor element from the slab of para-aramid fibers flowing down the cooling tunnel. In one embodiment, the water jet cut off slabs at timed intervals or distances. For instance, if an armor element is 4 feet in length and the para-aramid fibers travel at a pace of 2 feet per minute in the cooling tunnel, the water jet cuts a slab at every 2 minute intervals.

In a further embodiment, the water jet can also shape the armor element based on a cutting routing or operation. For example, if the armor element has a round shape, the cutting jet may include control mechanisms for travelling in x and y coordinates for extracting or cutting out a shape from the para-aramid fibers coming out of the cooling tunnel 110.

Another embodiment may include extraction or carving out armor elements separate from the cooling tunnel 110. For example, a water jet or other cutting tool may be at a separate location or facility from the system 100. Therefore, the extraction of specific armor elements is not expressly required to be performed in immediate proximity to the system 100.

It is recognized, another other suitable cutting element 116 may be utilized herein. The water jet is an exemplary embodiment but not an express limitation of a type of cutting element.

Figure 4:
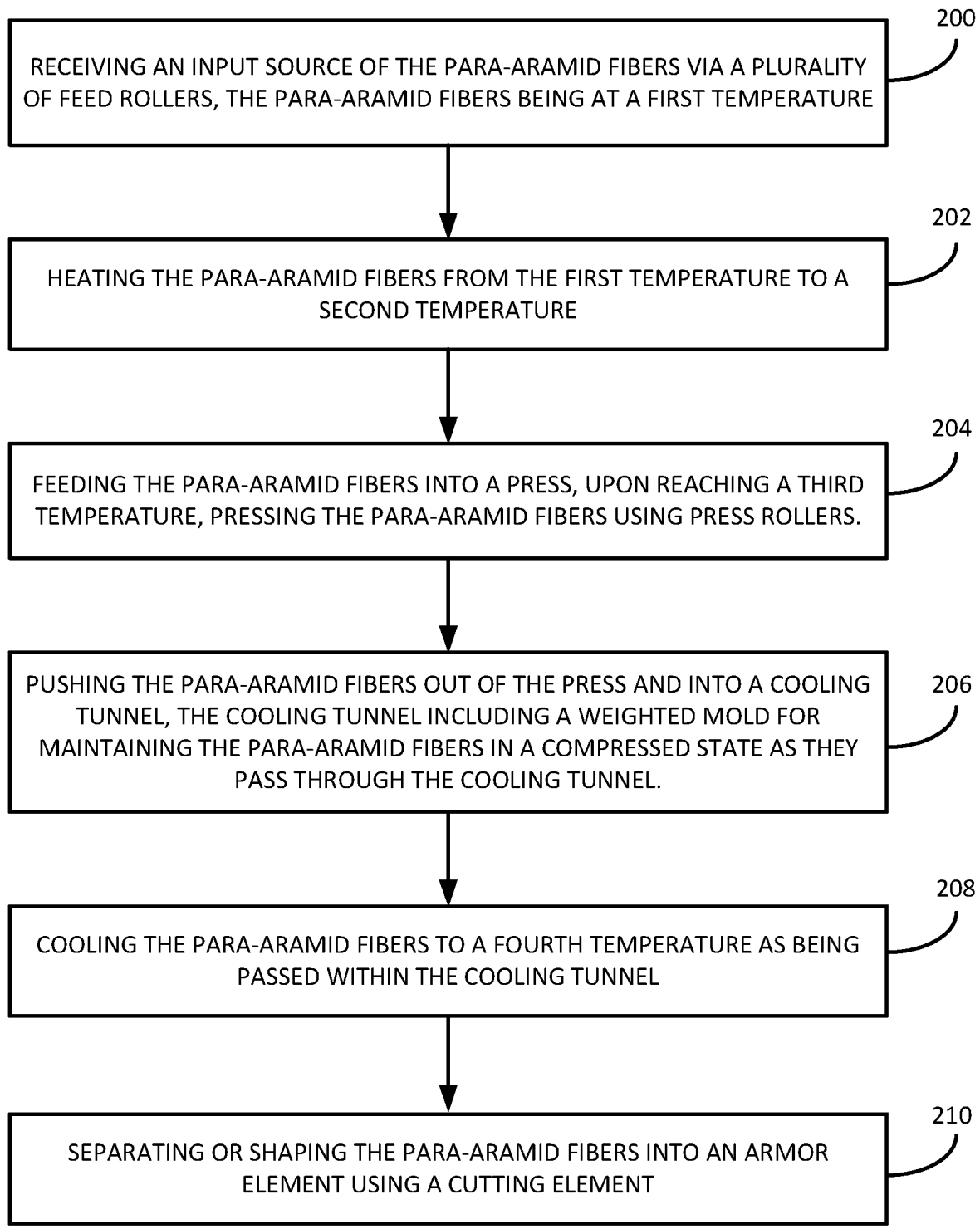
FIG. 4 illustrates a flowchart of the steps of one embodiment of a method for preparing armor.

FIG. 4 illustrates one embodiment of a manufacturing method. The method may be performed using the system 100. Step 200 is receiving an input source of the para-aramid fibers via a plurality of feed rollers, wherein the para-aramid fibers are at a first temperature. Here, the first temperature can be at or near room temperature.

Step 202 is heating the para-aramid fibers fed by the feed rollers from the first temperature to a second temperature. Any suitable heating source can be used, whereby the heating raises the temperature of the fibers to the second temperature, such as being within a range of 170-200 degrees Fahrenheit. The individual fibers are heated as they are rolled into a combined stream.

Step 204 is feeding the para-aramid fibers into a press and pressing the para-aramid fibers using a plurality of press rollers. Concurrent with pressing the fibers, the fibers are also heated to a third temperature. In embodiments, this third temperature is higher than the second temperature, but not too high to distort or destroy physical characteristics of the para-aramid fibers. In one embodiment, the third temperature can be between 200 and 215 degrees Fahrenheit.

In step 206, the para-aramid fibers are then passed into a cooling tunnel, including a weighted mold for maintaining the para-aramid fibers in a compressed state. The para-aramid fibers are pushed down the cooling tunnel by the press rollers operating in a continuous fashion.

In step 208, the para-aramid fibers cool from the third temperature to a fourth temperature. The cooling takes place based on the fibers entrapped in the tunnel of a determined length and fibers flowing at a determined rate. The fourth temperature may be similar or identical to the first temperature being at or around room temperature.

Step 210 is then extracting or separating armor elements from the para-aramid feed passing out of the cooling tunnel using a cutting element. For example, cooled slabs of para-aramid fibers can be feed out of the cooling tunnel and on to a holding table or other structure. Upon reaching a desired length, the slab is cut or separated from the flow of para-aramid fibers passing through the cooling tunnel. One embodiment may use a water jet, but it is recognized that any other suitable cutting machine or technique can be utilized.

The present method and system can generate armor elements that are, in aspects, 15-20 percent lighter than prior art manufacturing techniques. The inclusion of the press, heat, and cooling tunnel eliminates delamination complications, and cooling in the pressed state improves material properties of the combined para-aramid fibers.

The continuous forming process allows for a higher throughput of product over the prior techniques. The present heating and pressing operations can generate armor elements with a V-50 of 3950 FPS.

The present method and system may also utilize additional or complimentary heat sources for recycling heat and improving environmental condition. In one embodiment, heat may be extracted from external sources, such as a roof-based air conditioning unit and used as part of the heat source. Another heat source may be geothermal sources or boiler units.

In a further embodiment, the heat source may use steam or a chemical solution. For example, one solution can include poly-propylene glycol as a heating fluid. In this embodiment, glycol can additionally eliminate manufacturing defects because water or steam contacting the para-aramid fibers can induce blister issues.

In one embodiment, heating of water, glycol, or other sources, can be from alternative heat sources, including for example a HVAC roof top unit or a boiler. Dissipating heat can be captured and used to heat the water, glycol, or combination of both.

The input source for the armor preparation method and system is not limited to para-aramid fibers. Rather, other source materials, as recognized by one skilled in the art, may be used within the scope of the present disclosure. For example, one embodiment may include solid sheets of HDPE and/or UHMWPE. In another embodiment, the method and system may shape thinner thermos plastics like Merkalon® Acetal®, and other exemplary poly ethane products.

FIGS. 1 through 4 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

What is claimed is:

1. A system for preparing armor made of para-aramid fibers, the system comprising:
   a plurality of feed rollers operative to feed an input source of the para-aramid fibers, wherein the para-aramid fibers are at room temperature;
   a heating mechanism encapsulating at least a portion of the plurality of feed rollers, the heating mechanism heating the para-aramid fibers fed by the plurality of feed rollers from room temperature to a second temperature;
   a press, comprising a plurality of press rollers, wherein upon the para-aramid fibers reaching the second temperature the para-aramid fibers at the second temperature are fed into the press and compressed between the plurality of press rollers and increased to a third temperature; and
   a cooling tunnel configured to receive the compressed para-aramid fibers at the third temperature, the cooling tunnel comprising a weighted mold for maintaining the compressed para-aramid fibers at the third temperature in a compressed state as the compressed para-aramid fibers at the third temperature pass through the cooling tunnel and cool from the third temperature to a fourth temperature.

2. The system of claim 1 further comprising:
   a cutting element operative to cut or shape the cooled para-aramid fibers into an armor element.

3. The system of claim 1 further comprising:
   a plurality of spools, wherein each spool comprises at least one strand of para-aramid fibers; and
   wherein the plurality of feed rollers are configured to engage and feed the para-aramid fibers from the plurality of spools as an input source.

4. The system of claim 1, wherein the press comprises a plurality of plates forming the weighted mold for the para-aramid fibers, wherein the plurality of plates comprise a curved shape.

5. The system of claim 1, wherein the press is configured to provide a pressing force in the amount of 50 tons when pressing the para-aramid fibers moving therethrough.

6. The system of claim 1, wherein the second temperature is within a range of 170 to 200 degrees Fahrenheit.

7. The system of claim 6, wherein the third temperature is within a range of 205 to 215 degrees Fahrenheit.

8. The system of claim 1, wherein the cooling tunnel comprises a cooling chamber element configured to draw heat from the compressed para-aramid fibers at the third temperature to cool the compressed para-aramid fibers from the third temperature to the fourth temperature.

9. A method for preparing armor made of para-aramid fibers, the method comprising:
   receiving an input source of the para-aramid fibers via a plurality of feed rollers, wherein the para-aramid fibers are at room temperature;
   heating the received para-aramid fibers fed by the plurality of feed rollers from room temperature to a second temperature;
   upon reaching the second temperature, feeding the heated para-aramid fibers at the second temperature into a press, pressing the para-aramid fibers at the second temperature using a plurality of press rollers, and heating the para-aramid fibers at the second temperature to a third temperature; and pushing the pressed and heated para-aramid fibers at the third temperature out of the press and into a cooling tunnel, the cooling tunnel comprising a weighted mold for maintaining the pressed and heated para-aramid fibers at the third temperature in a compressed state as the pressed and heated para-aramid fibers at the third temperature pass through the cooling tunnel and cool from the third temperature to a fourth temperature.

10. The method of claim 9 further comprising:
cutting or shaping the cooled para-aramid fibers into an armor element using a cutting element.

11. The method of claim 9, wherein the receiving of the input source of the para-aramid fibers comprises receiving from a plurality of spools each comprising at least one strand of para-aramid fibers.

12. The method of claim 9, wherein the press includes a plurality of plates forming the weighted mold for the para-aramid fibers, wherein the plurality of plates comprise a curved shape.

13. The method of claim 9, wherein the pressing comprises asserting a pressing force in an amount of 50 tons when pressing the para-aramid fibers between the press rollers.

14. The method of claim 9, wherein the second temperature is within a range of 170 to 200 degrees Fahrenheit.

15. The method of claim 14, wherein the third temperature is within a range of 205 to 215 degrees Fahrenheit.

16. The method of claim 9 further comprising:
as the pressed and heated para-aramid fibers at the third temperature pass along the cooling tunnel, drawing heat from the pressed and heated para-aramid fibers at the third temperature via a cooling chamber as the pressed and heated para-aramid fibers cool from the third temperature to the fourth temperature.

17. A method for preparing armor made of para-aramid fibers, the method comprising:
receiving an input source of the para-aramid fibers via a plurality of feed rollers from a plurality of spools, wherein the para-aramid fibers are at room temperature;
heating the para-aramid fibers fed by the plurality of feed rollers to a temperature range of 170 to 200 degrees Fahrenheit;
feeding the heated para-aramid fibers into a press comprising a plurality of press rollers;
heating the para-aramid fibers fed into the press within a range of 205 to 215 degrees Fahrenheit;
pressing the heated para-aramid fibers fed into the press between the plurality of press rollers using a force amount between 40 to 60 tons of pressure;
pushing the pressed para-aramid fibers out of the press and into a cooling tunnel, the cooling tunnel comprising a weighted mold for maintaining the pressed para-aramid fibers in the cooling tunnel in a compressed state as the pressed para-aramid fibers in the cooling tunnel pass through the cooling tunnel to cool the pressed para-aramid fibers in the cooling tunnel; and
cutting or shaping the cooled para-aramid fibers into an armor element.

18. The method of claim 17, wherein the press includes a plurality of plates forming the weighted mold for the para-aramid fibers, wherein the plurality of plates comprise a curved shape.

* * * * *